(12) United States Patent
Lai et al.

(10) Patent No.: US 6,721,833 B2
(45) Date of Patent: Apr. 13, 2004

(54) ARBITRATION OF CONTROL CHIPSETS IN BUS TRANSACTION

(75) Inventors: Jiin Lai, Taipei (TW); Chau-Chad Tsai, Taipei (TW); Sheng-Chang Peng, Taipei (TW); Chi-Che Tsai, Kaohsiung Hsien (TW)

(73) Assignee: Via Technologies, Inc., Taipei Hsien (TW)

( * ) Notice: Subject to any disclaimer, the term of this patent is extended or adjusted under 35 U.S.C. 154(b) by 407 days.

(21) Appl. No.: 09/735,412

(22) Filed: Dec. 12, 2000

(65) Prior Publication Data

US 2001/0004749 A1 Jun. 21, 2001

(30) Foreign Application Priority Data

Dec. 15, 1999 (TW) ........................................ 88121973 A

(51) Int. Cl.[7] ........................ G06F 13/36; G06F 13/362
(52) U.S. Cl. ........................ 710/113; 710/119; 710/120; 710/121; 710/306; 710/309; 710/313; 710/314; 710/113; 710/114
(58) Field of Search ........................ 710/119, 120, 710/121, 113, 114, 306, 309, 313, 314, 107, 117

(56) References Cited

U.S. PATENT DOCUMENTS

| 5,581,782 A | * | 12/1996 | Sarangdhar et al. | ........ 710/119 |
| 5,787,264 A | * | 7/1998 | Christiansen et al. | ........ 710/113 |
| 6,012,111 A | * | 1/2000 | Gulick | ........ 710/62 |
| 6,047,345 A | * | 4/2000 | Kondo et al. | ........ 710/110 |
| 6,073,199 A | * | 6/2000 | Cohen et al. | ........ 710/113 |
| 6,195,722 B1 | * | 2/2001 | Ram et al. | ........ 710/310 |
| 6,202,112 B1 | * | 3/2001 | Gadagkar et al. | ........ 710/118 |
| 6,223,244 B1 | * | 4/2001 | Downer et al. | ........ 710/244 |
| 6,253,270 B1 | * | 6/2001 | Ajanovic et al. | ........ 710/107 |
| 6,347,351 B1 | * | 2/2002 | Osborne et al. | ........ 710/119 |

FOREIGN PATENT DOCUMENTS

TW     242183 A  *  3/1995  ........... G06F/11/28

OTHER PUBLICATIONS

Alnuweiri, Hussein M., "Synchronous Bus Arbitration with Constant Logic Per Module," Apr. 26–29, 1994, IEEE Eighth Annual Proceedings of Parallel Processing Symposium, pp. 35–41.*

Ramesh, Tirumale, "Bus Arbitration in an Embedded Processor–Shared Multiprocessor System," Aug. 16–18, 1993, IEEE Proceedings of the Midwest Symposium on Circuits and Systems, vol. 1, pp. 320–322.*

* cited by examiner

Primary Examiner—Xuan M. Thai
Assistant Examiner—Donna K. Mason
(74) Attorney, Agent, or Firm—J. C. Patents

(57) ABSTRACT

A bus arbitration method within a control chipset, The control chipset further comprises a first control chip and a second control chip, data are transferred between the first and the second control chips through a bus, the bus comprises a bidirectional bus The first control chip usually control the authority to use the bus, however the second control chip has higher priority to use the bus. Accompany with a bus specification without waiting cycle, to arbitrate the authority to use the bus can be done fast and without errors. Therefore, no GNT signal line is required and the arbitration time reduces.

8 Claims, 11 Drawing Sheets

ARBITRATION OF CONTROL CHIPSETS IN BUS TRANSACTION

CROSS-REFERENCE TO RELATED APPLICATION

This application claims the priority benefit of Taiwan application serial no. 88121973, filed December 1999.

BACKGROUND OF THE INVENTION

1. Field of Invention

The present invention relates to a bus transaction method. More particularly, the present invention relates to a transaction method between the control chipsets in a computer system.

2. Description of Related Art

FIG. 1 is a block diagram showing a PCI bus system connecting various components of a conventional computer system. As shown in FIG. 1, a central processing unit 10 is coupled to the PCI bus 14 via a host bridge 12. The master controller of several PCI compatible peripheral devices such as a graphic adapter 16a, an expansion bus bridge 16b, a LAN adapter 16c and a SCSI host bus adapter 16d can also be coupled to the PCI bus 14. Each of these master controllers is able to send out a request (REQ) signal demanding the use of the PCI bus 14. The host bridge 12 serves as an arbitrator that sends out grant (GNT) signals to the controller when the PCI bus 14 is available.

Data transmission between PCI compatible devices (such as the master controllers or the north bridge of a computer chipset) are controlled by a few interface control signals. A cycle frame (FRAME) is issued from an initiator (can be the master controller or the north bridge) indicating the initialization of a data access operation and the duration therein, As soon as the FRAME signal is out, data transaction via the PCI bus begins. A low potential for the FRAME signal indicates data transmission is in progress. After the initiation of data transaction, the address bus AD will send out a valid address during the address cycle. In the meantime, the command/byte enable (CBE[3:0]) signal lines will send out a valid bus command (according to PCI specification) so that the target device knows the data transaction mode demanded by the initiator. In general, the four bits of the command/byte enable signal lines are capable of coding tip to a maximum of 16 different commands, and each command is defined in detail in the PCI specification. After the effective address is out, a data cycle begins in which data is transmitted through the address bus AD. In the meantime, byte enable signals are sent so that data can be transmitted. When the transmission of FRAME signal stops, the last set of data is transmitted and no more in the current transaction An initiator ready (IRDY) signal and a target ready (TRDY) signal are also used by the system for displaying the readiness of the initiating device and the target device in data transaction. In a data read operation, the IRDY signal indicates that the initiator is ready to receive the demanded data. In a data write operation, the TRDY signal indicates that the target device is ready to receive the demanded data. A stop (STOP) signal is used by the target device to request a termination of data transaction from the initiator.

FIG. 2 is a timing diagram showing the various signals in the PCI bus interface during a read operation. The period within which data are transmitted via the PCI bus is known as a bus transaction cycle 20. The bus transaction cycle 20 includes an address cycle 22 and several data cycles, for example, 24a, 24b and 24c. Each data cycle 24a/b/c can be further divided into a wait cycle 26a/b/c and a data transfer cycle 28a/b/c. The following is a brief description of the PCI bus interface during a read operation for illustrating the control signals according to PCI specification.

During cycle T1, a FRAME signal is sent by the initiator indicating the start of a data transaction while a start address is put on the address bus AD lines to locate the target device of the transaction. In the meantime, a read command is transmitted through the CBE lines. After the delivery of the read command, a byte enable signal is put on the CBE lines. The byte enable signals are sent throughout the data cycles (including 24a, 24b and 24c). During cycle T2, the initiator submits an initiator ready signal IRDY indicating its readiness for data transmission. However, the target device is still not ready yet. Hence, the target device keeps preparing the data while the initiator idles in the wait cycle 26a of the data cycle 24a. During cycle T3, the target device has prepared all the necessary data for transmission, thereby sending out a target ready TRDY signal. Therefore, in data cycle 28a, both IRDY and TRDY are out and so the initiator can begin to read data from the target device. During cycle T4, the target device no longer issues the target ready TRDY signal, which signals the end of the first set of transmission data, Meanwhile, a set of data is prepared inside the target device. Again, the initiator enters a wait cycle 26b within the data cycle 24b. During cycle T5, the target ready TRDY signal is issued indicating the second set of data is ready. The second set of data is ready by the initiator in cycle 28b when both the HEY and the TRDY signals are issued. When the initiator has insufficient time to read all the data from the target device as in cycle T6, the IRDY signal terminates. Since the TRDY signal is still out, the wait cycle 26c is activated by the initiator. As soon as the initiator is ready again as in cycle T7, the IRDY signal is re-issued. The initiator reads the data from the target device during data transfer cycle 28c when both IRDY and TRDY signals are issued, thereby completing a single read operation.

To carry out proper data transaction according to the conventional PCI specification, complicated control signals, wait states, arbitration steps must be used. Typically, up to 45 to 50 signaling pins are required according to the PCI specification. In general, complicated procedure is unnecessary for internal transaction between control chipsets. Hence, to speed up internal transaction between control chipsets, a simplified transaction method that adheres to the conventional PCI specification is needed.

However, transactions between control chips of a PC generally do not use all of the complicated functions provided by the PCI specification. The performance between the control chips usually decreases. As the device integration increases, the control chips may be integrated to a single one chip and more functions are provided. For example, the CPU, north bridge and the south bridge are formed integrally into a single chip. Therefore, pins of the chip package become very important sources. In order to increase the speed of transactions between the control chips, a simplified and specific specification for use between the control chips is required.

SUMMARY OF THE INVENTION

The present invention provides a control chips, data transaction method between control chips within the control chipset and a bus arbitration method between the control chips within the control chipset. Therefore, the performance of the control chipset increases, and types and numbers of signal lines between the control chips are reduced.

The present invention provides a data transaction method of a control chipset and between control chips within the control chipset. The data or commands can be continuously transmitted without any waiting cycle, stop or retry.

The present invention a data transaction method of a control chipset and between control chips within the control chipset, wherein the signal lines for waiting status, data transaction cycle and stop/retry protocol are not required.

The present invention provides a bus arbitration method between control chips which can reduce the arbitration time.

The present invention provides a bus arbitration method between control chips which a bus grant signal line is not required.

According to the present invention, data buffers of the control chips of the control chipset have fixed size and amount. In addition, read/write acknowledge commands are asserted in sequence according to read/write commands, by which a control chips can detect the status of the buffers within another control chip. When a control chip asserts a command, the corresponding data must be prepared in advance. Therefore, the signal line for providing the waiting status, data transaction cycle and stop/retry protocol can be omitted. Accordingly, commands or data can be continuously transmitted without waiting, stop or retry, which enhances the performance of the transmission.

According to the bus arbitration method of the present invention, a control chip usually control the authority to use the bus, however the other chip has higher priority to use the bus. Accompany with a bus specification without waiting cycle, to arbitrate the authority to use the bus can be done fast and without errors. Therefore, no GNT signal line is required and the arbitration time reduces. Because the transaction requested by a second control chip is always granted, the overall performance increases.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

The present invention provides a transaction method and an arbitration method between control chipsets or between chipsets within a control chipset, which can promote the efficiency of data transaction between the control chipsets. Namely, simplify the bus transaction process between control chipsets. The control chipsets composed of a north bridge and a south bridge within a computer system, such as a personal computer (PC), are used as an example for describing the preferred embodiment according to the present invention. As defined by the conventional PCI specification, 45 command signal lines are required for communicating between the south bridge and the north bridge. However, in the preferred embodiment of the present invention, only 15 command signal lines are required for replacing the original 45 command signal lines defined by the PCI specification. The newly defined 15 commands of the present invention are named as Virtual Link (VLINK) commands.

Figure 1:
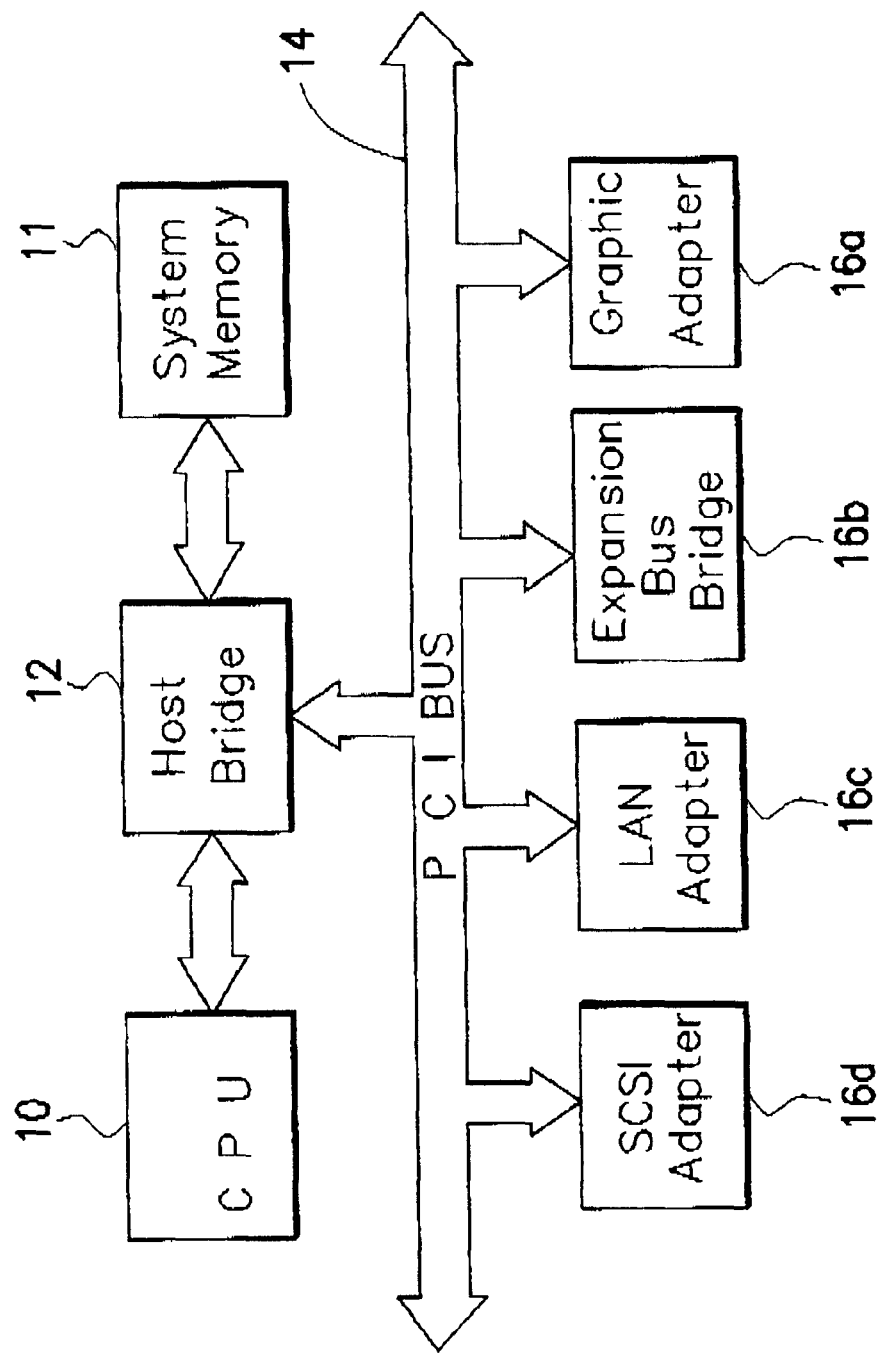
FIG. 1 is a block diagram showing a PCI bus system connecting various components of a conventional computer system.
Figure 2:
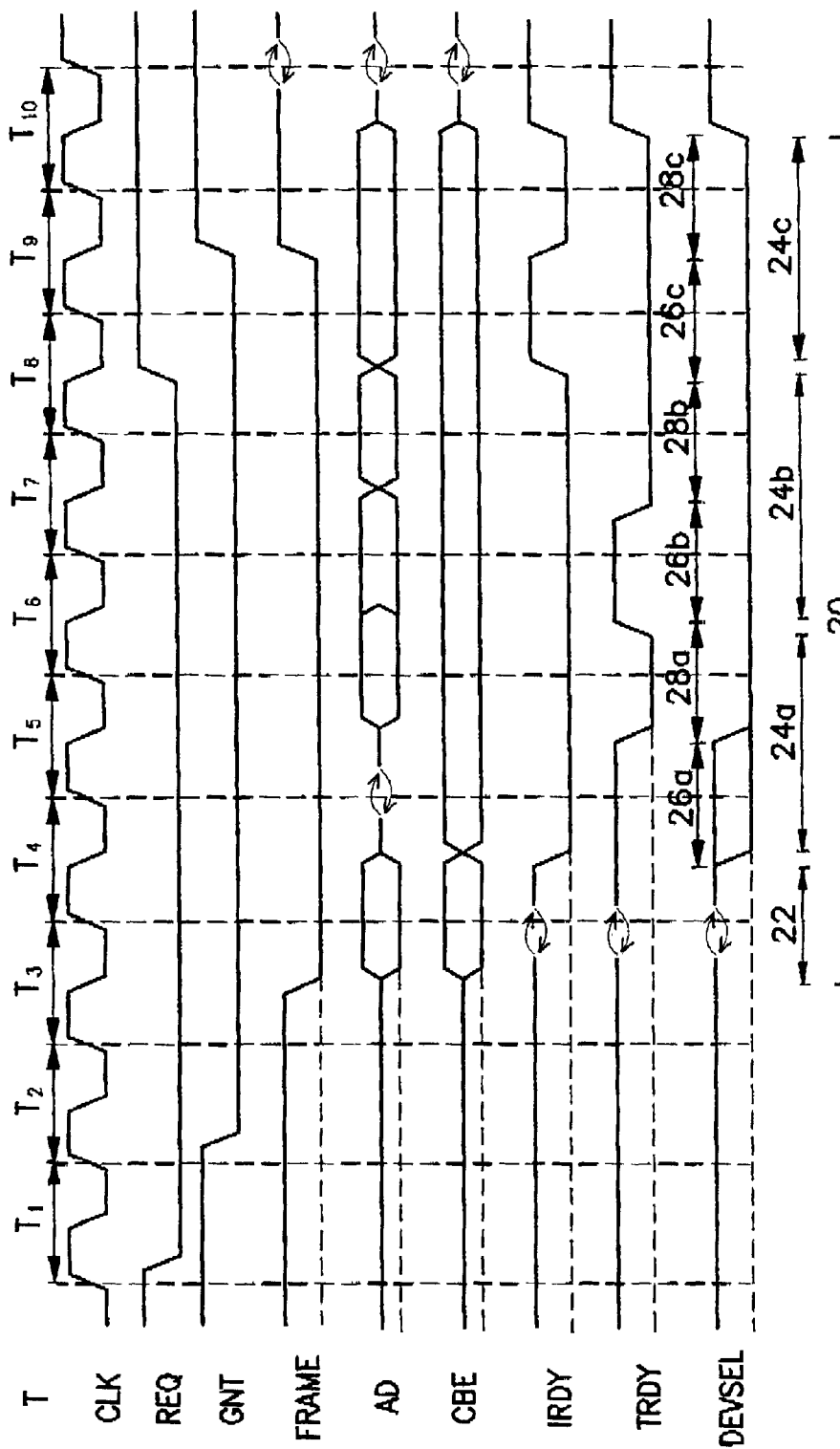
FIG. 2 is a timing diagram showing the various signals in the PCI bus interface during a read operation.
Figure 3:
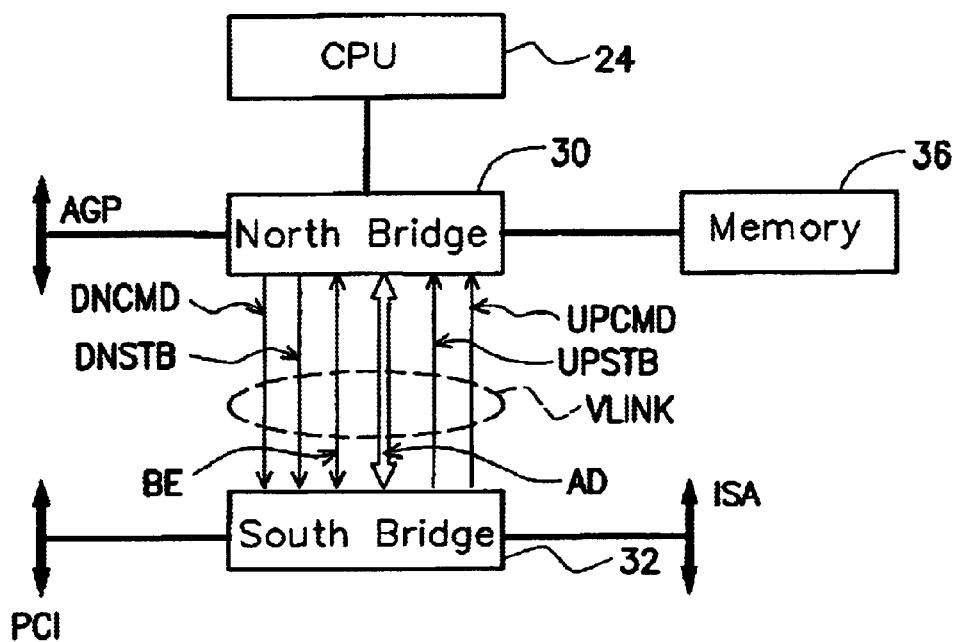
FIG. 3 is a block diagram showing the control signals used in data transaction between control chipsets inside a control chipset module according to the embodiment of this invention.

Referring to FIG. 3 and table 1, FIG. 3 schematically shows a block diagram of a control chipset according to a preferred embodiment of the present invention, in which control signal lines between a north bridge and a south bridge of the control chipset are illustrated in detail Table 1 lists the meaning of each control signal lines shown in FIG. 3. The control chipset, for example, comprises the south bridge 30 and the north bridge 32. The communicating signal lines between the south bridge 30 and the north bridge 32 are reduced from 45 signal lines of the PCI specification to 15 signal lines of the present invention. Therefore, additional 30 (=45−15) pins of the south bridge 30 and the north bridge 32 can be used for other purposes, by which the functions of the chipset are promoted.

As shown in FIG. 3 and Table 1, the data and address bus (AD bus) defined by the original PCI specification is reserved but reduced to 8 bidirectional signal lines while CBE, FRAME, IRDY, TRDY, STOP, DEVSEL, REQ and GNT signal lines are simplified to a bidirectional byte enable (BE) signal line, a uplink command signal line UPCMD and a uplink strobe signal line UPSTB both driven by the south bridge, and a downlink command signal line DNCMD and a downlink strobe signal line DNSTB both driven by the north bridge. Each of the north bridge 32 and the south bridge 30 drives an independent command signal line, which both can assert bus commands. In addition, if a bus command is asserted and the bus authority is obtained by one control chip, the control chip can send addresses on the AD bus and data length corresponding to the current command, or send data on the AD bus and byte enable signal for the data on the BE signal line.

TABLE 1

| Signals | Initiated By | Remark |
| --- | --- | --- |
| CLK | | 66 MHz clock signal |
| DNSTB | North Bridge | Down Strobe |
| UPSTB | South Bridge | Up Strobe |
| DNCMD | North Bridge | Down Command |
| UPCMD | South Bridge | Up Command |
| BE | North Bridge/South Bridge | Byte Enable |
| AD[7:0] | North Bridge/South Bridge | Address/Data bus |
| VREF | | Reference Voltage |
| COMP | | Impedance Comparison |

Figure 4:
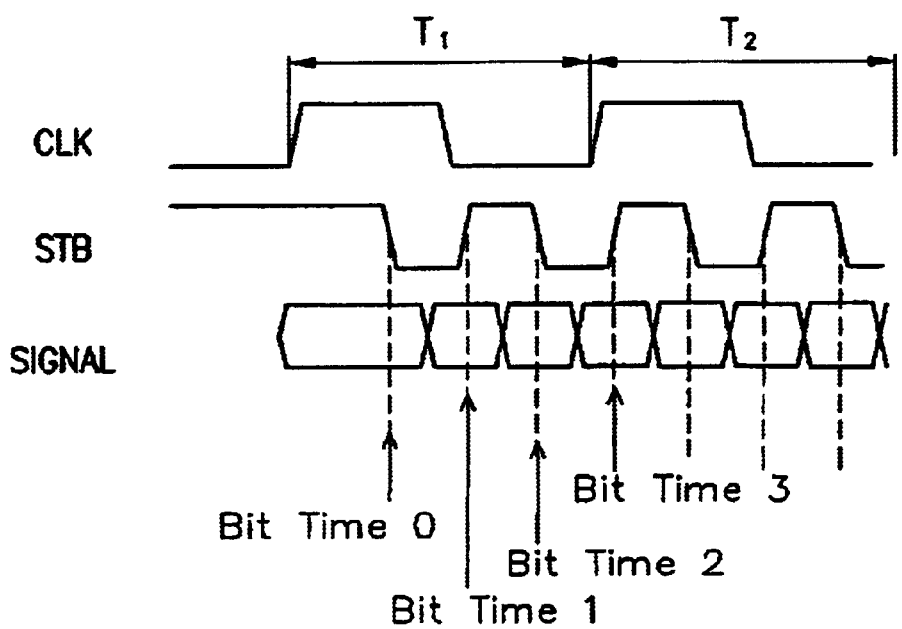
FIG. 4 is a diagram showing a clock cycle containing four bit times for command coding according to this invention.

FIG. 4 illustrates a timing relationship between a bus clock signal (CLK), a strobe signal (STB) and bit times of data lines for transferring data according to the present invention. As shown in FIG. 4, one clock period comprises two strobe clock periods. Namely, the frequency when the uplink strobe signal and downlink strobe signal are active is twice the frequency of the bus clock signal. There are four bit times 0~3 defined by the rising and falling edges of the strobe signal. Therefore, 4 bit data are obtained by using the four bit times 0~3 on each data line and bus commands are encoded, Accordingly, 32 bit data are obtained using 8 data lines during each clock period, which is equivalent to that data are transferred using 32 data lines in the conventional PCI specification In addition, as if the BE signal line represents a data length, 1~16 (4 bits) data length information are obtained within one clock period.

A various types of data transactions are defined using the uplink command UPCMD and the downlink command DNCMD. The uplink command UPCMD driven by the south bridge comprises a read acknowledge command (NB to SB) C2PRA, a write acknowledge command (NB to SB) C2PWA, a read command P2CR (SB to NB), and a write command (SB to NB) P2CW etc. The relations between uplink commands and the bit time encoding are listed in Table 2. The request signal REQ is asserted at bit time 0 which is not overlapped with the other bus commands. Therefore, the REQ signal can be sent at any time, and even at the same clock period which a bus command is asserted. The downlink command DNCMD driven by, the north bridge comprises an input/output read command (NB to SB) C2PIOR, a memory read command (NB to SB) C2PMR, an input/output write command (NB to SB) C2PIOW, a memory write command (NB to SB) C2PMW, a read acknowledge command (SB to NB) P2CRA, and a write acknowledge command (SB to NB) P2CWA etc. The relations between downlink commands and the bit time encoding are listed in Table 3. No grant signal GNT is defined in the present invention.

The commands asserted by the north bridge and the south bridge are corresponding to each other. When the south bridge sequentially asserts a number of P2CR arid/or P2CW, the north bridge must sequentially assert the corresponding P2CRA and/or P2CWA commands in response to the P2CR and/or P2CW commands asserted by the south bridge. Similarly, when the north bridge sequentially asserts a number of C2PIOR, C2PMR, C2PIOW and C2PMW commands, the south bridge must sequentially assert the corresponding C2PRA and C2PWA commands in response to the commands asserted by the north bridge. In addition, as described in the preferred embodiment, the data corresponding to each command asserted by the control chip must be prepared in advance. For example, the data for being written into the memory must be ready when the south bridge asserts a P2CW command and the data for transferring the read data from the memory to the south bridge must be ready when the north bridge asserts a P2CRA command. Accordingly, pause or interruption of the data transmission can be avoided.

TABLE 2 uplink command UPCMD

| Bit Time 0 REQ | Bit Time 1 PMSTR | Bit Time 2 MIO | Bit Time 3 WR | Explanation |
|---|---|---|---|---|
| — | 0 | — | 0 | C2PRA |
| — | 0 | — | 1 | C2PWA |
| — | 0 | 0 | 0 | P2CR |
| — | 0 | 0 | 1 | P2CW |

TABLE 2-continued uplink command UPCMD

| Bit Time 0 REQ | Bit Time 1 PMSTR | Bit Time 2 MIO | Bit Time 3 WR | Explanation |
|---|---|---|---|---|
| — | 1 | 1 | 0 | NOP |
| 0 | — | — | — | REQ |

TABLE 3 downlink command DNCMD

| Bit Time 0 | Bit Time 1 PMSTR | Bit Time 2 MIO | Bit Time 3 WR | Explanation |
|---|---|---|---|---|
| — | 0 | 0 | 0 | C2PIOR |
| — | 0 | 0 | 1 | C2PIOW |
| — | 0 | 1 | 0 | C2PMR |
| — | 0 | 1 | 1 | C2PMW |
| — | 1 | 0 | 0 | P2CRA |
| — | 1 | 0 | 1 | P2CWA |
| — | 1 | 1 | 1 | NOP |

Figure 5:
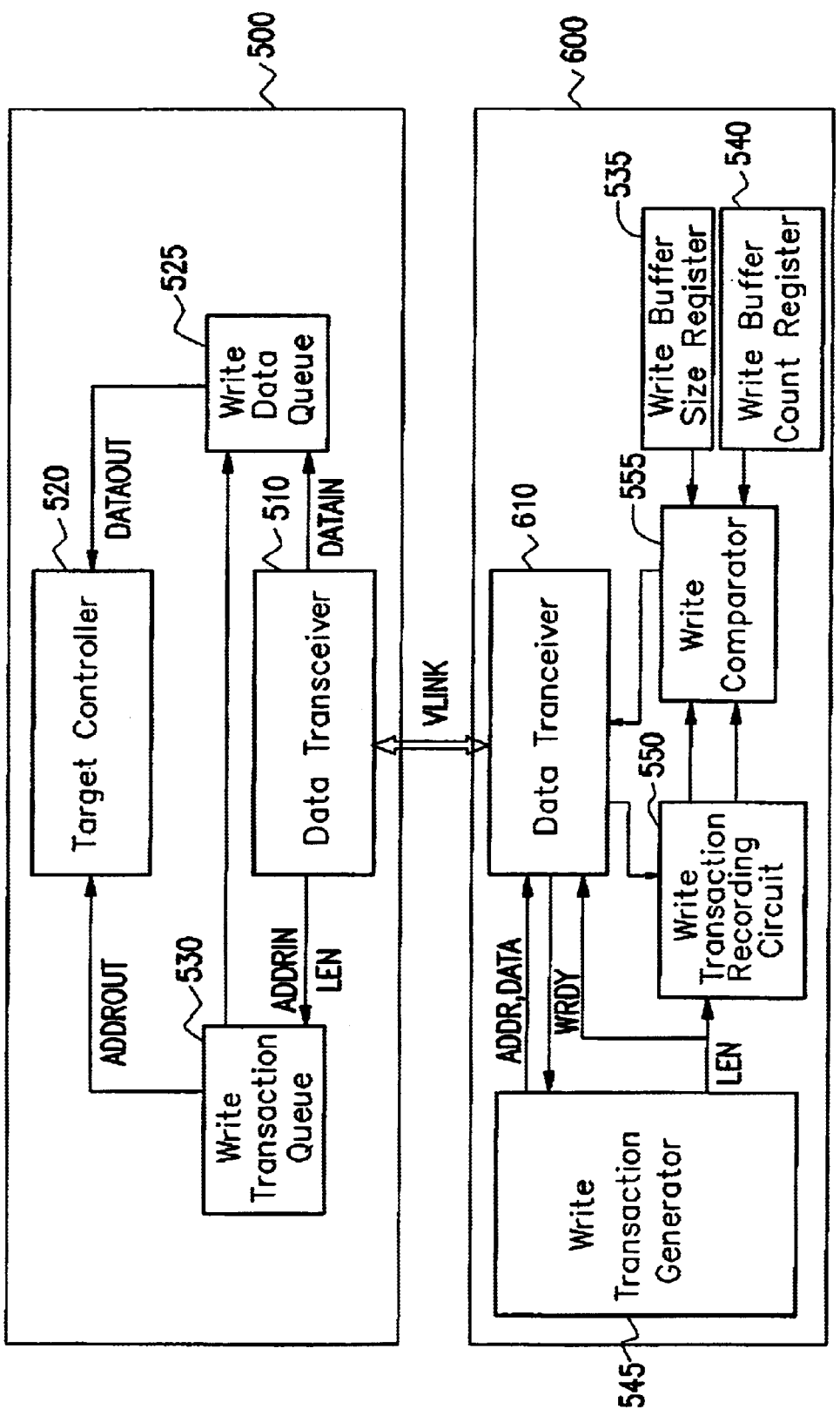
FIG. 5 schematically illustrates a block diagram of a control chipset according to one preferred embodiment for write transactions according to the present invention FIG. 6 schematically illustrates a block diagram of a control chipset according to one preferred embodiment for read transactions according to the present invention.

FIG. 5 schematically illustrates a block diagram of a control chipset according to one preferred embodiment for write transactions according to the present invention. The control chipset, for example, comprises a first control chip and a second control chip. In general application of the personal computer, the first and the second control chips may be the north bridge 500 and the south bridge 600. The first control chip (north bridge) 500 and the second control chip (south bridge) 600 are coupled by a special designed bus which control signals of the bus are the VLINK of the present invention. The north bridge 500 comprises a data transceiver 510, target controller 520 (for example, a memory controller), write data queue 525 and a write transaction queue 530. The south bridge 600 comprises a data transceiver 610, write buffer size register 535, write buffer count register 540, write transaction generator 545, write transaction recording circuit 550 and write comparator 555.

The data transceiver 510 met the VLINK specification of the present invention directly couples to the VLINK bus. Through the VLINK bus, the data transceiver 510 can receive and transmit data to complete a number of write transactions. One write transaction is defined as that the south bridge 600 sends a P2CW command and data corresponding to the P2CW command and then the north bridge 500 asserts a P2CWA command for responding the P2CW command. The write transaction queue 530 temporally stores a number of data lengths and write addresses of all write transactions in sequence, The depth of the write transaction queue 530 determines the maximum total number of write transactions that the north bridge 500 can handle. The write data queue 525 stores the data from the south bridge 600 and to be sent to the target controller 520. The depth of the write data queue 525 determines the maximum number of the write data that the north bridge 500 can handle, The target controller 520 sends data to a target, for example a external memory, that receives the data according to a write address and a data length that are first stored in the write transaction queue 530 and data stored in the write data queue 525 corresponding to the write address and data length. The first data transceiver 510 sends a write acknowledge signal (the P2CWA command) to inform the south bridge 600 the corresponding transaction finished.

Then, the corresponding data stored in the write data queue 525 are released and the released space can store another data.

The write buffer count register 540 and the write buffer size register 535 of the south bridge 600 respectively store the maximum number of write transactions allowed to be stored in the write transaction queue 530 and the maximum number of data allowed to be stored in the write data queue 525 of the north bridge 500. For example, the maximum number of write transactions acceptable in the write transaction queue 530 is 4 and the maximum number of data acceptable in the write data queue 525 is 16. The two parameters, the maximum numbers of write transactions and data, that is, the write buffer count and the write buffer size can be setup by BIOS (basic input output system) configuration during booting or be fixed during chipset design.

The data transceiver 610 is coupled to the VLINK bus for receiving and transmitting data through the VLINK bus to complete all write transactions. When the data transceiver 610 receives a P2CWA command, a signal which indicates successful write and buffer release is sent to write transaction recording circuit 550 for releasing space that stores the data length of the currently corresponding write transaction. When a is new data length, a write address and data of next write transaction are generated by the write transaction generator 545, the new data length is then sent to the write transaction recording circuit 550.

The write transaction recording circuit 550 is capable of calculating the data numbers used in the write data queue 525 and the write transaction numbers used in the write transaction queue 530. This is because the write transaction recording circuit 550 sequentially stores the data lengths of all write transactions, and the P2CWA asserted by the north bridge 500 is responded in accordance with the sequence of the P2CW commands asserted byte south bridge 600. Therefore, the south bridge 600 can recognize the status of buffers in the queues within the north bridge 500.

The write transaction recording circuit 550 can send the data numbers used in the write data queue 525 and the write transaction numbers used in the write transaction queue 530 to the write comparator 555. The write comparator 555 then respectively compares the received data with the maximum data numbers of the write data queue 525 stored in the write data buffer size register 535 and the maximum write transaction numbers of write transaction queue 530 stored in the write buffer count register 540. If the data received by the write comparator 555 is less than the maximum data numbers and the maximum transaction numbers, the write comparator 555 acknowledges the data transceiver 610 the ability to send another write transaction.

Figure 6:
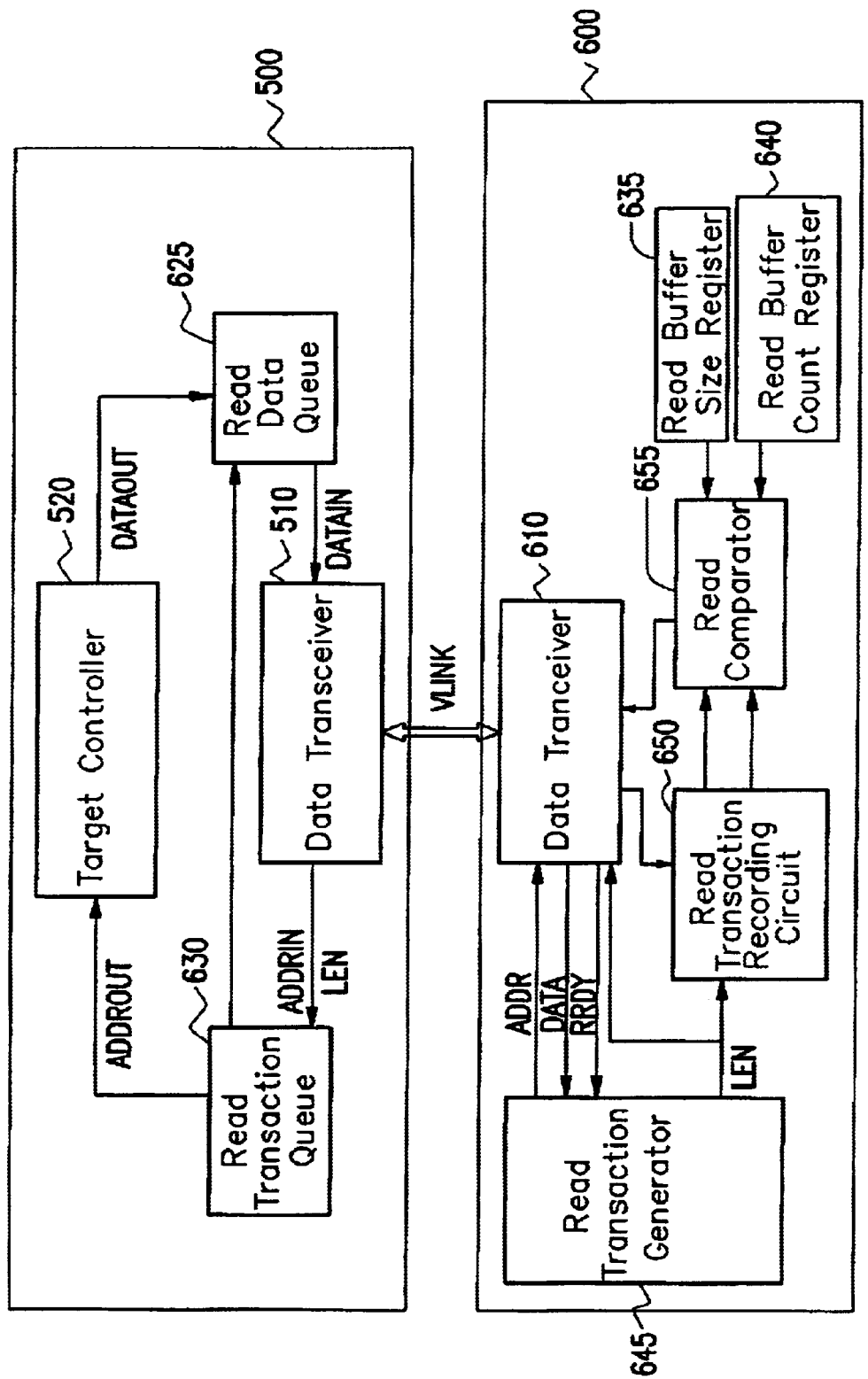

FIG. 6 schematically illustrates a block diagram of a control chipset according to one preferred embodiment for read transactions according to the present invention The control chipset, for example, comprises a first control chip and a second control chip. In general application of the personal computer, the first and the second control chips may be the north bridge 500 and the south bridge 600. The first control chip (north bridge) 500 and the second control chip (south bridge) 600 are coupled by a special designed bus which control signals of the bus are the VLINK of the present invention. The north bridge 500 comprises a data transceiver 510, target controller 520 (for example, a memory controller), read data queue 625 and a read transaction queue 630. The south bridge 600 comprises a data transceiver 610, a read buffer size register 635, a read buffer counting register 640, a read transaction generator 545, a read transaction recording circuit 650 and a read comparator 655

The data transceiver 510 met the VLINK specification of the present invention directly couples to the VLINK bus. Through the VLINK bus, the data transceiver 510 can receive and transmit data to complete a number of read transactions. One read transaction is defined as that the south bridge 600 sends a P2CR command and then the north bridge 500 sends a P2CRFA command and corresponding data for responding the P2CR command. The read transaction queue 630 temporally stores a number of data lengths and read addresses of all read transactions in sequence, The depth of the read transaction queue 630 determines the maximum number of read transactions that the north bridge 500 can handle. The read data queue 625 temporally stores a number of the read data from the target controller, which is to be sent to south bridge 600. The depth of the read data queue 625 determines the maximum number of read data that the north bridge 500 can handle. The target controller 520 reads data from a target, for example an external memory, and then stores in the read data queue 625 according to a read address and a data length that are first stored in the read transaction queue 630 and data stored in the read data queue 625 corresponding to the read address and data length. The first data transceiver 510 sends a read acknowledge signal (the P2CRA command) and the read data stored in the read data queue 625 Then, the corresponding data stored in the read data queue 625 are released and the released space can store another data.

The read buffer count register 640 and the read buffer size register 635 of the south bridge 600 respectively store the maximum number of read transactions able to be stored in the read transaction queue 630 and the maximum number of data able to be stored in the read data queue 625 of the north bridge 500. For example, the maximum number of read transactions able to be stored in the read transaction queue 630, the read buffer count is 4 and the maximum number of data able to be stored in the read data queue 625, the read buffer size is 16. The two parameters, the read buffer count and the read buffer size can be setup by BIOS (basic input output system) configuration during booting or be fixed during chipset design.

The data transceiver 610 is coupled to the VLINK bus for receiving and transmitting data through the VLINK bus to complete all read transactions. When the data transceiver 610 receives a P2CRA command, a signal which indicates successful read and buffer release is sent to read transaction recording circuit 650 for releasing space that stores the data length of the currently corresponding read transaction. When a new data length, a read address and data of next read transaction are generated by the read transaction generator 645, the new data length is then sent to the read transaction recording circuit 650.

The read transaction recording circuit 650 is capable of calculating the data numbers used in the read data queue 625 and the read transaction numbers used in the read transaction queue 630. This is because the read transaction recording circuit 650 sequentially stores the data lengths of all read transactions, and the P2CRA asserted by the north bridge 500 is responded in accordance with the sequence of the P2CR commands asserted by the south bridge 600. Therefore, the south bridge 600 can recognize the status of buffers in the queues within the north bridge 500.

The read transaction recording circuit 650 can send the data numbers used in the read data queue 625 and the read transaction numbers used in the read transaction queue 630 to the read comparator 655. The read comparator 655 then respectively compares the received data with the maximum data numbers of the read data queue 625 stored in the read data buffer size register 635 and the maximum read transaction numbers of the read transaction queue 630 stored in the read buffer counting register 640. If the data received by the read comparator 655 is less than the maximum data numbers and the maximum read transaction numbers, the read comparator 655 informs the data transceiver 610 the ability to initiate another read transaction.

The north bridge and south bridge are the first control chipset and the second control chipset respectively and the commands are sent by the south bridge to control the north bridge to read or write data. However, to those skilled in the art, both the north and south bridges can have the corresponding structures, and therefore, the commands are not limited to be sent by the south bridge or the north bridge. Namely, the south and the north bridges can be the first control chipset and the second control chipset respectively.

The description above does not discuss that how the north bridge and the south bridge gets the authority to use the VLINK bus. The following paragraphs discuss an arbitration method between chipsets according to the present invention. According to the present invention, the first control chip usually control the authority to use the bus, however the second control chip has higher priority to use the bus. When the second control chip asserts a request signal to use the bus, the first control chip has to release the bus authority to the second control chip immediately, or release the bus authority to the second control chip immediately after the first control chip finishes the current bus command cycle. Accompany with a bus specification without waiting cycle, such as an VLINK bus, to arbitrate the authority to use the bus can be done fast and without errors.

The present invention is directed to a method of bus arbitration within a control chipset. The control chipset may comprise a first control chip (such as a north bridge) and a second control chip (such as s south bridge). Data are transmitted between the first and the second control chips through a bus (such as an VLINK bus) without waiting cycle. The bus further comprises a common bidirectional bus as shown in FIGS. 3–6.

The second control chip has to know all of the bus commands having fixed clock numbers and the clock numbers that the commands use the bidirectional bus. When the second control chip asserts a first command (such as a read command) to the first control chip, the second control chip has to memorizes clock numbers of the acknowledge command and data corresponding to the first command asserted by the first control chip, in which the clock numbers of the acknowledge command and data responded by the first command are determined by information containing in the first command. For example, when the south bridge asserts a P2CR command to the north bridge, the data length is detected by the south bridge and the VLINK bus does not require a waiting cycle, therefore, the south bridge can know the clock numbers of a P2CRA command and data sent by the north bridge.

When the second control chip needs to use the bus, the second control chip directly asserts a bus request signal. As the first control chip detects the bus request signal and if the first control chip does not use the bidirectional bus currently, and then the first control chip release the bus authority to the second control chip and does not drive the bidirectional bus. But, if the first control chip uses the bidirectional bus currently, the first control chip immediately release the bus authority to the second control chip after the control chip finishes the current bus command and transaction.

Figure 7A:
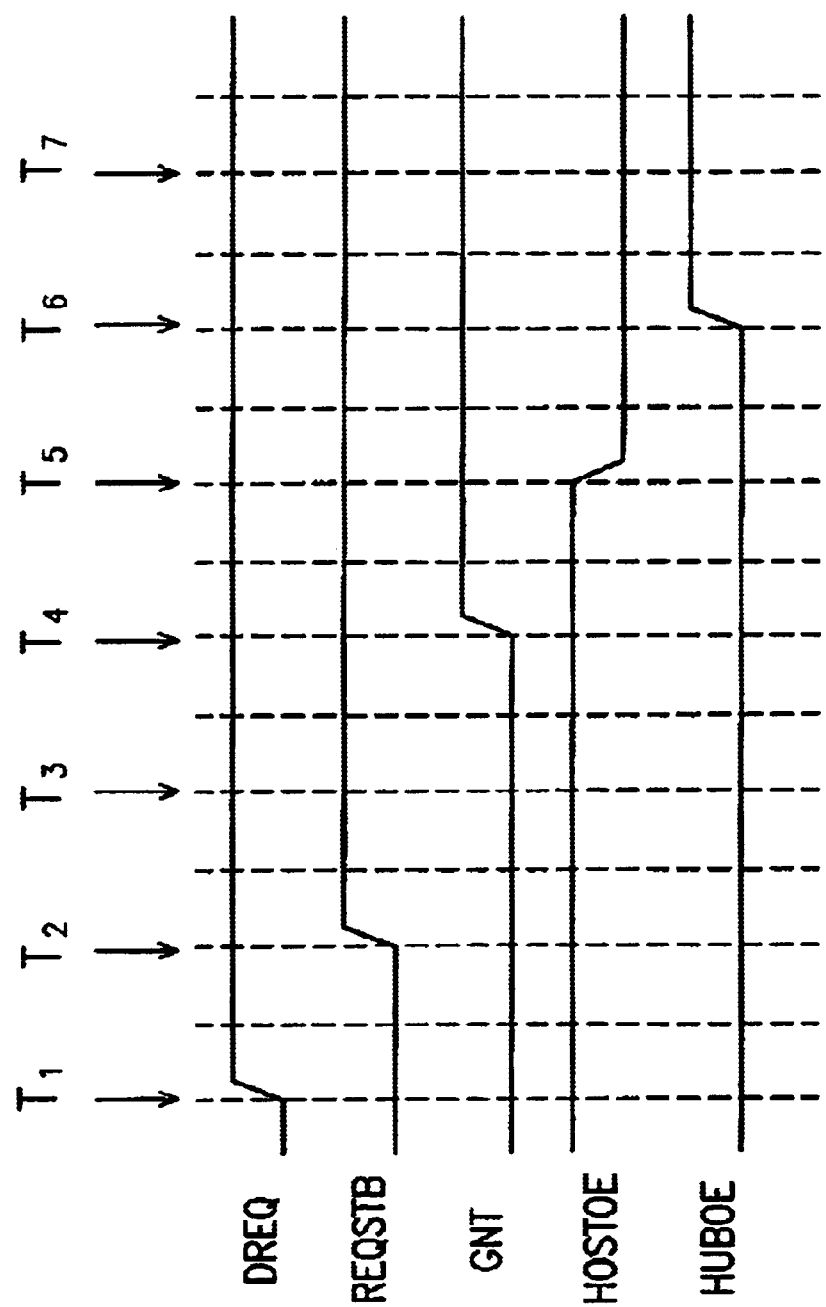
FIG. 7a shows a timing diagram of conventional bus arbitration method.

In contrast, when the second control chip asserts the bus request signal, the second control chip then detects that whether the bidirectional bus is used by the first control chip currently. When the second control chip does not detect that the first control chip uses the bidirectional bus currently, the second control chip then waits a predetermined cycle and continuously detects the bidirectional bus. The second control chip then drive the bidirectional bus after the predetermined waiting cycle. The purpose of the predetermined waiting cycle is that the signals transmitted through the bidirectional bus may be delayed. In order to avoid that the second control chip detects that the first control chip doe not use the bus while a command has been asserted by the first control chip. In addition, in order to avoid that the first and the second control chips drive the bidirectional bus simultaneously, there must be existing a turn-around cycle of one clock period for transferring the bus authority, When the second control chip detects that the first control chip uses the bus currently, the south bridge can detects that what bus command is executed by the first control chip currently and what clock numbers are needed for completing the bus command. The second control chip then drives the bus by waiting a turn-around cycle after the first control chip completes the current bus command. In the conventional bus arbitration method having a GNT command, the first control chip drives a GNT command to the second control chip to acknowledge that the second control chip can begin to drive the bus, and then the second control chip drives the bus after a turn-around cycle following that the second control chip detects the GNT command sent by the first control chip. Referring to FIG. 7A, at period T1, the second control chip asserts a request signal DREQ. At period T2, the second control chip asserts a signal REQSTB. The first control chip receives the request signal at period T4 and then immediately asserts a GNT command to acknowledge the second control chip that bus can be used. The first control chip stops driving the bus at period T5. At period T6, the second control chip receives the GNT signal and then begins to drive the bus. Therefore, the time for arbitrating the bus authority wastes by using the GNT command according to the conventional method.

Following are several examples for describing the timing according to the method of the present invention. FIGS. 7B, 8–11 schematically show the timing diagrams concerning grant to and request for the bus authority. In the following examples, the south bridge asserts a request signal for use of the bus. The signal DREQ represents an internal signal that the south bridge request to use the bus. The high level of the signal DREQ represents that the south bridge request to use the bus internally. The signal REQSTB is also an internal signal, wherein the south bridge asserts a REQ signal at bit time 0 using the uplink command signal line UPCMD when the REQSTB is at high level. The high level of signals HOSTOE (host output enable) or KUBOE (Hub output enable) respectively represents the north bridge or the south bridge obtains the bus authority to drive the bus.

Figure 7B:
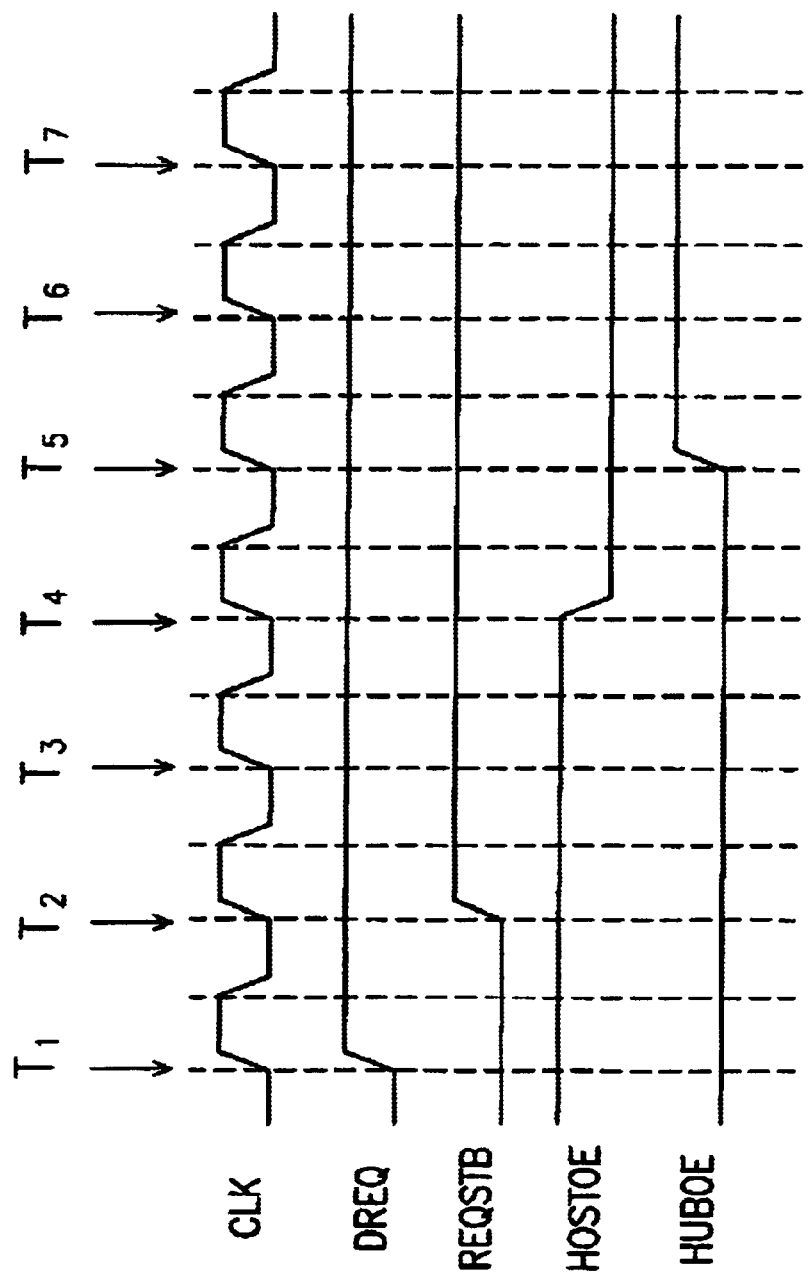
FIGS. 7b and 8–11 schematically show examples of the bus arbitration method according to the present invention.

Refer to FIG. 7B. At period T1, the signal DREQ rises to high level which means the south bridge needs to use the bus. At period T2, the request strobe signal REQSTB rises to high level, and the south bridge asserts a real request signal REQ at bit time 0 using UPCMD. The REQSTB is accepted at period T4 due to transmission delay. Therefore, if the north bridge initiates a command cycle, the north bridge may assert a downlink command DNCMD at period T3. And the south bridge detects the command cycle till period T5. If the north bridge does not asserts a downlink command, the south bridge then has the authority to use the BE/AD bus and asserts an uplink command and drives the BE/AD bus at period T5. In this example, the south bridge asserts a real REQ command at period T2 and drives the BE/AD bus at period T5 after waiting a predetermined cycle (three clock numbers) which comprises a turn-around cycle.

Figure 8:
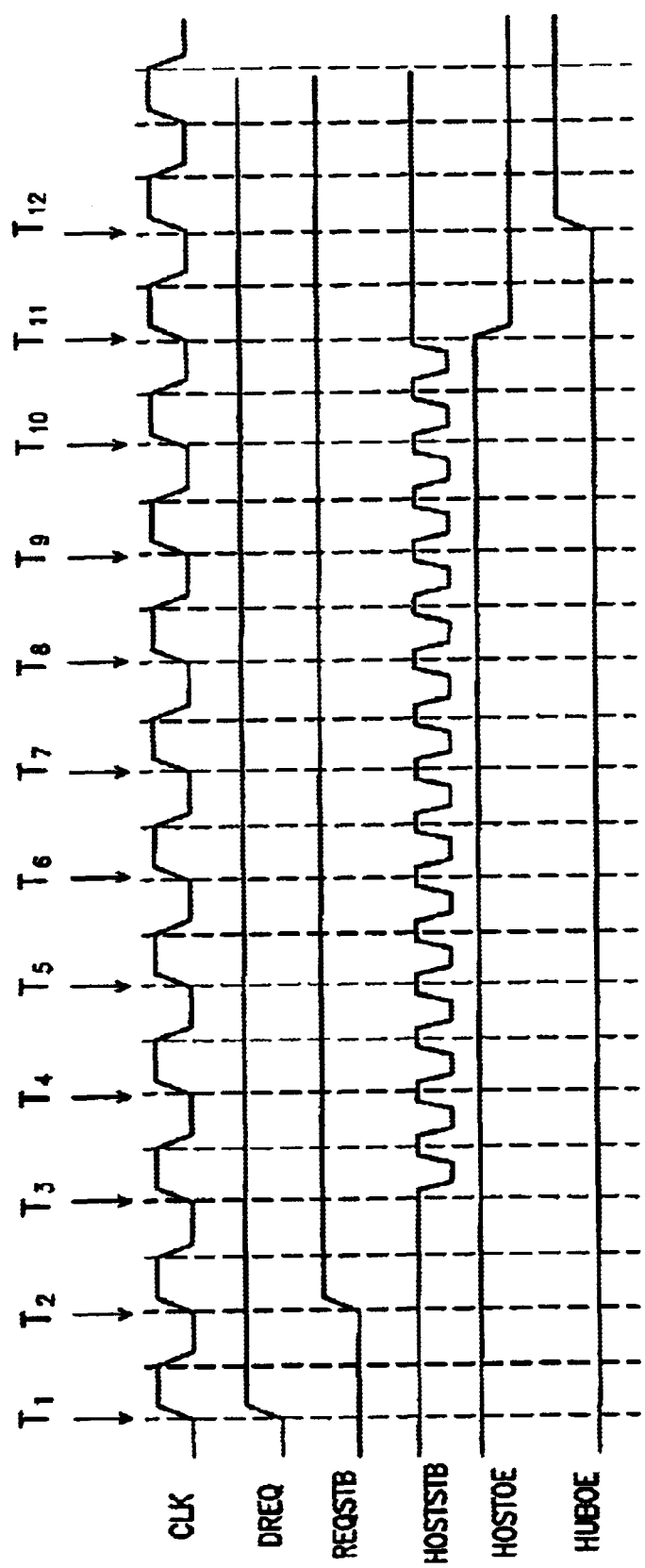

Refer to FIG. 8. At period T1, the signal DREQ rises to high level, which means the south bridge needs to use the bus. At period T2, the signal REQSTB rises to high level and then the south bridge asserts a real request signal REQ at bit time 0 through uplink command signal line UPCMD. However, the north bridge asserts a downlink command, such as a P2CRA command, at period T3. Assuming that the data length corresponding to the transaction is eight double words (8DW). The 8 DW data are transferred during periods T3 to T10. The south bridge knows the clock numbers of the transaction and confirms that the north bridge releases the bus authority after completing the transaction, and the south bridge therefore can drive the BE/AD bus at period T12 after a turn-around cycle at period T11.

Figure 9:
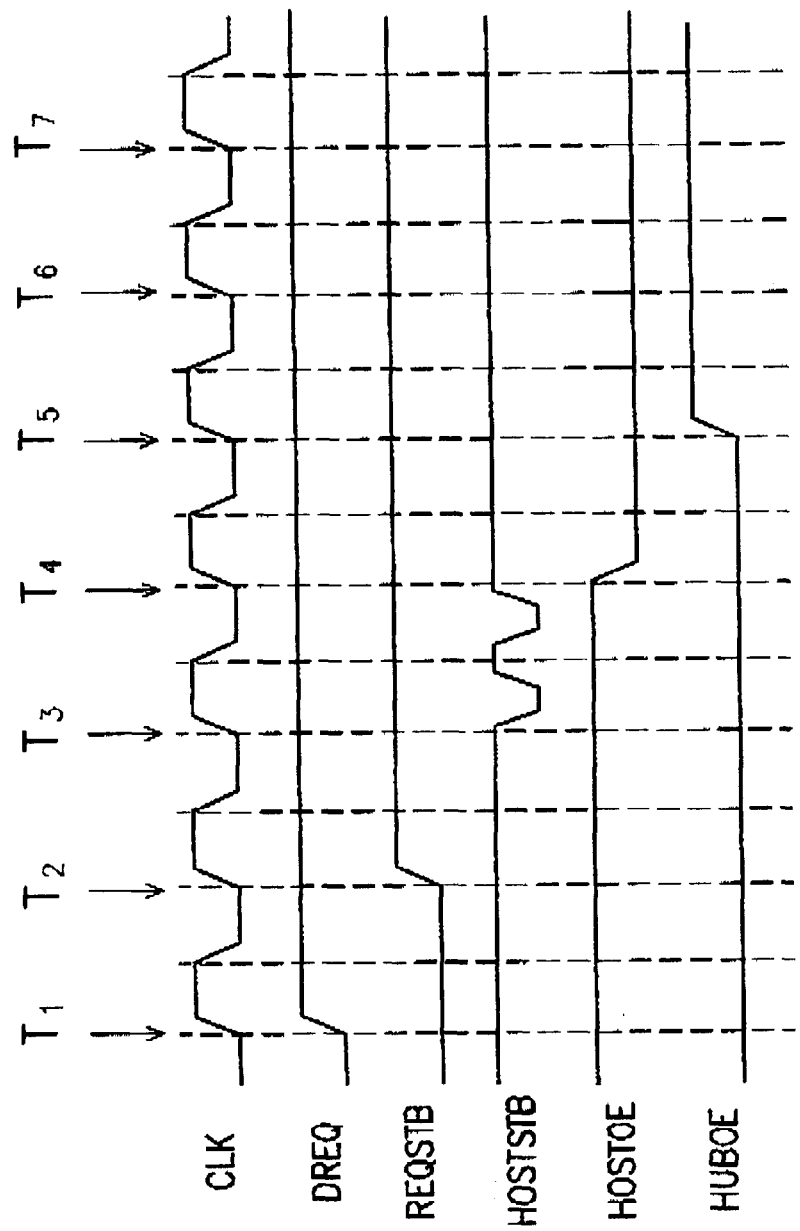

Refer to FIG. 9. At period T1, DREQ becomes high level, which represents the south bridge need to use the bus. At period T2, the request strobe signal REQSTB changes to high level, and the south bridge asserts a real request signal REQ at bit time 0 through uplink command signal line UPCMD, However, the north bridge asserts a downlink command, for example a C2PR command. The clock number of the C2PR command is fixed as one clock period, which is executed at period T3. The south bridge knows clock numbers of all commands having fixed executing period, and confirms that north bridge will release the bus authority. Therefore, the south bridge can drive the bidirectional BE and AD bus at period T5 after a turn-around cycle.

Figure 10:
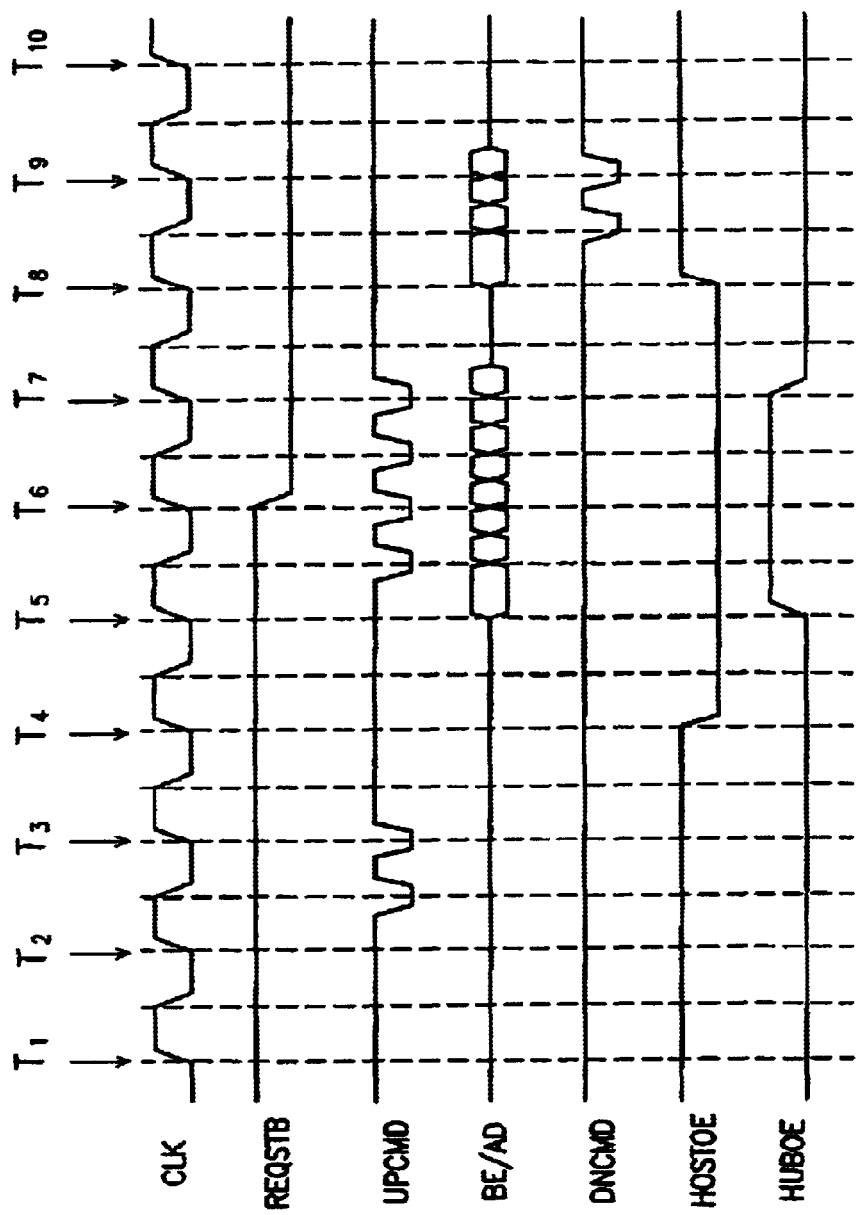

Refer to FIG. 10. Assume that REQSTB is high and the south bridge has been granted to use the bus. The south bridge begins to assert uplink command UPCMD and drive the bidirectional bus. In the preferred embodiment, two consecutive P2CR commands are asserted and data are transferred during period T5 and T6. The signal REQSTB changes to low level at period T6. Namely, even the south bridge still uses the bus and asserts a P2CR command, however the request signal has been cancelled at bit time 0 of period T6. Therefore, the north bridge detects that the south bridge stop requesting to use the bus before period T8 and drives the BE/AD signal lines at period T8.

Figure 11:
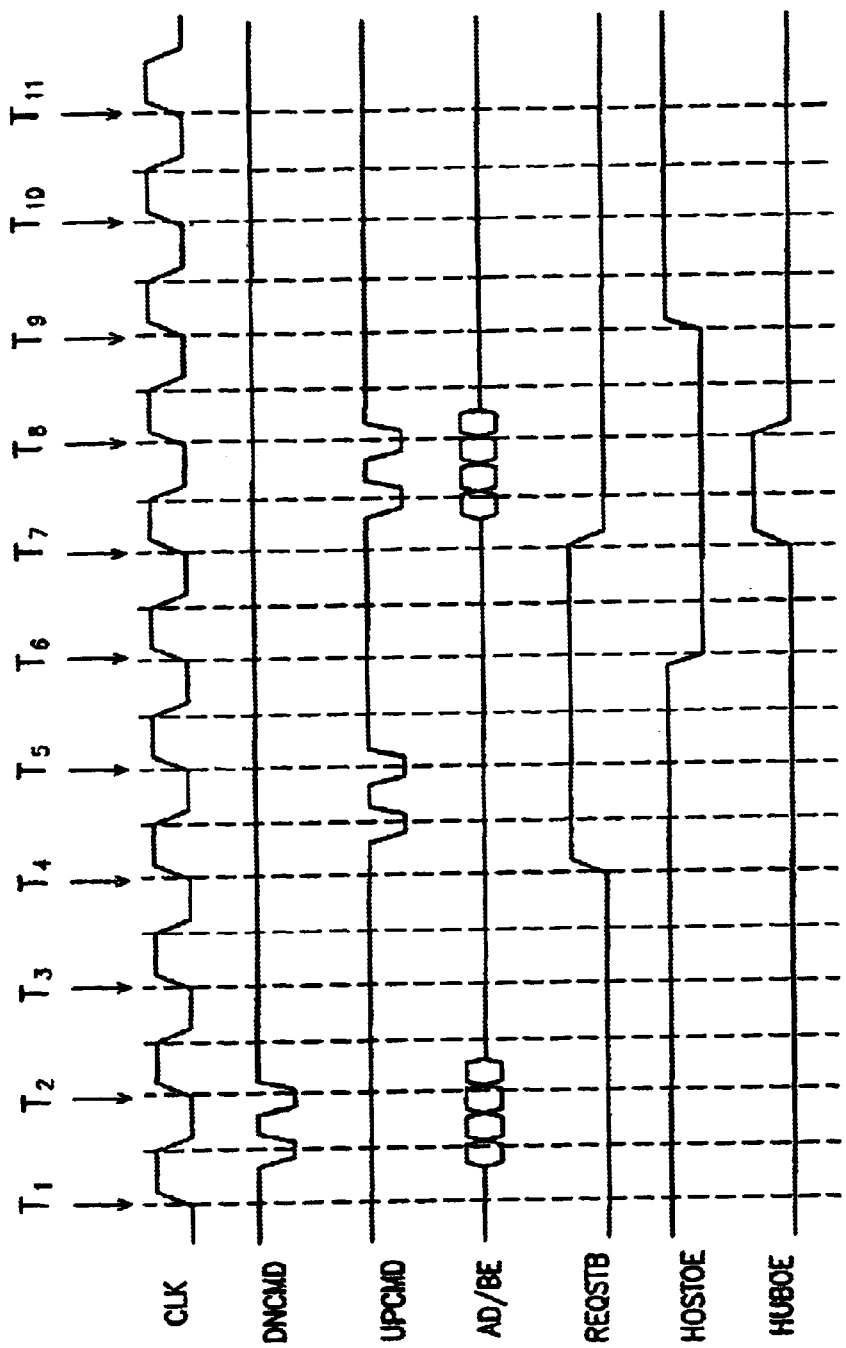

Refer to FIG. 11. At period T1, the north bridge asserts a read command C2PR. When the data prepared by the south bridge have been ready, the south bridge drives the signal REQSTB to become high level. After waiting a predetermined three clock numbers, the south bridge drives the AD bus to send the data which the north bridge requires at period T7, and asserts a C2PRA command on UPCMD signal line at the same time. In addition, the request signal REQ asserted at bit time 0 of period T7 has been canceled and the north bridge gets the authority to use the bus at period T9.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A bus arbitration method within a control chipset, wherein the control chipset further comprises a first control chip and a second control chip, data are transferred between the first and the second control chips through a bus, the bus comprises a bidirectional bus, the bus arbitration method within a control chipset comprising:

the second control chip asserting a request signal for using the bus when the second control chip needs to use the bus;

the first control chip immediately stopping driving the bus if the first control chip does not use the bus currently, or the first control chip stopping driving the bus after the first chip completes a current bus transaction, when the first control chip detects the request signal;

the second control chip driving the bus after waiting for a predetermined time when the second control chip detects that the first control chip is not using the bus currently; and the second control chip driving the bus after waiting a clock numbers for executing a current bus command by the first control chip and a turn-around cycle, when the second control chip detects that the first control chip uses the bus currently.

2. The method of claim 1, further comprising:

the first control chip providing clock numbers for executing current bus command to the second control chip by way of the bidirectional bus;

the second control chip memorizing clock numbers of an acknowledge and data responded by the first control chip corresponding to outstanding commands when the second control chip asserts the commands to the first control chip, wherein the clock numbers of the acknowledge and data responded by the first control chip are determined by the outstanding commands.

3. The method of claim 1, wherein data are transferred within the control chipset through the bus that further comprises an address/data bus, a length/byte enable signal line, an uplink command signal line, an uplink strobe signal line, a downlink command signal line, a downlink strobe signal line and a clock signal line, wherein the bidirectional bus comprises the address/data bus and the length/byte enable signal line.

4. The method of claim 1, wherein data are transferred between the first and the second control chips which are a north bridge and a south bridge respectively on a computer mother board.

5. The method of claim 1, wherein data are transferred between the first and the second control chips which are a south bridge and a north bridge respectively on a computer mother board.

6. The method of claim 3, wherein frequencies of the uplink strobe signal line and the downlink strobe signal line are twice the frequency of the clock signal line.

7. The method of claim 6, wherein the request signal is asserted through the uplink command signal line.

8. The method of claim 7, wherein the request signal is asserted through the uplink command signal line at a first signal changing within one clock period.

* * * * *